US008477760B2

(12) United States Patent
Lee et al.

(10) Patent No.: US 8,477,760 B2
(45) Date of Patent: Jul. 2, 2013

(54) METHOD AND APPARATUS FOR PERFORMING ACTIVE PACKET BUNDLING IN A VOICE OVER IP COMMUNICATIONS SYSTEM BASED ON VOICE CONCEALABILITY

(75) Inventors: Minkyu Lee, Ringoes, NJ (US); James William McGowan, Whitehouse Station, NJ (US); Michael Charles Recchione, Nutley, NJ (US)

(73) Assignee: Alcatel Lucent Paris (FR)

( * ) Notice: Subject to any disclaimer, the term of this patent is extended or adjusted under 35 U.S.C. 154(b) by 2021 days.

(21) Appl. No.: 11/288,694

(22) Filed: Nov. 29, 2005

(65) Prior Publication Data
US 2007/0121586 A1  May 31, 2007

(51) Int. Cl.
*H04L 12/66* (2006.01)
(52) U.S. Cl.
USPC ............................ 370/352; 370/473; 370/477
(58) Field of Classification Search
None
See application file for complete search history.

(56) References Cited

U.S. PATENT DOCUMENTS

| 5,255,339 | A  | * | 10/1993 | Fette et al. | 704/200 |
|---|---|---|---|---|---|
| 2002/0101886 | A1 | * | 8/2002 | Jagadeesan | 370/516 |
| 2004/0100991 | A1 | * | 5/2004 | Samadi et al. | 370/473 |

OTHER PUBLICATIONS

Hoene, Wiethoelter, Wolisz. "Calculation of Speech Quality by Aggregating the Impacts of Individual Frame Losses," Proc. of Thirteen International Workshop on Quality of Service (IWQoS 2005), Passau, 2005.*
Henning, S. et al., "Speech Property-Based FEC for Internet Telephony Applications," proceedings SPIE/ACM/SIGMM Multimedia Computing and Networking Conference 2000, San Jose, CA, Jan. 2000.
U.S. Appl. No. 10/394,118, filed Mar. 21, 2003, M. Lee et al.
U.S. Appl. No. 10/936,990, filed Sep. 9, 2004, M. Lee et al.
U.S. Appl. No. 10/953,907, filed Sep. 29, 2004, M. Lee et al.
U.S. Appl. No. 11/062,966, filed Feb. 22, 2005, M. Lee et al.
U.S. Appl. No. 11/078,012, filed Mar. 11, 2005, M. Lee et al.

* cited by examiner

*Primary Examiner* — Ricky Ngo
*Assistant Examiner* — Justin N Mullen
(74) *Attorney, Agent, or Firm* — Wolff & Samson PC

(57) ABSTRACT

A method and apparatus for performing a active packet bundling in a VoIP (Voice over Internet Protocol) based on a measure of voice concealability of one or more speech packets to be transmitted. Voice concealability is a property of a speech packet which indicates the likelihood that a given speech segment will meet the "quasi-stationary" (QS) behavior assumed by conventional Packet Loss Concealment (PLC) algorithms used to compensate for transmission loss of speech packets. By ensuring that only well-concealed frames are delayed for bundling, it is more likely that the receiver will run the PLC algorithm when it is most effective (i.e., when it is likely to perform well at reconstructing the missing speech frame), rather than when it is more likely to be ineffective. This allows for a reduction in bandwidth while minimizing any potential negative impact on quality.

18 Claims, 1 Drawing Sheet

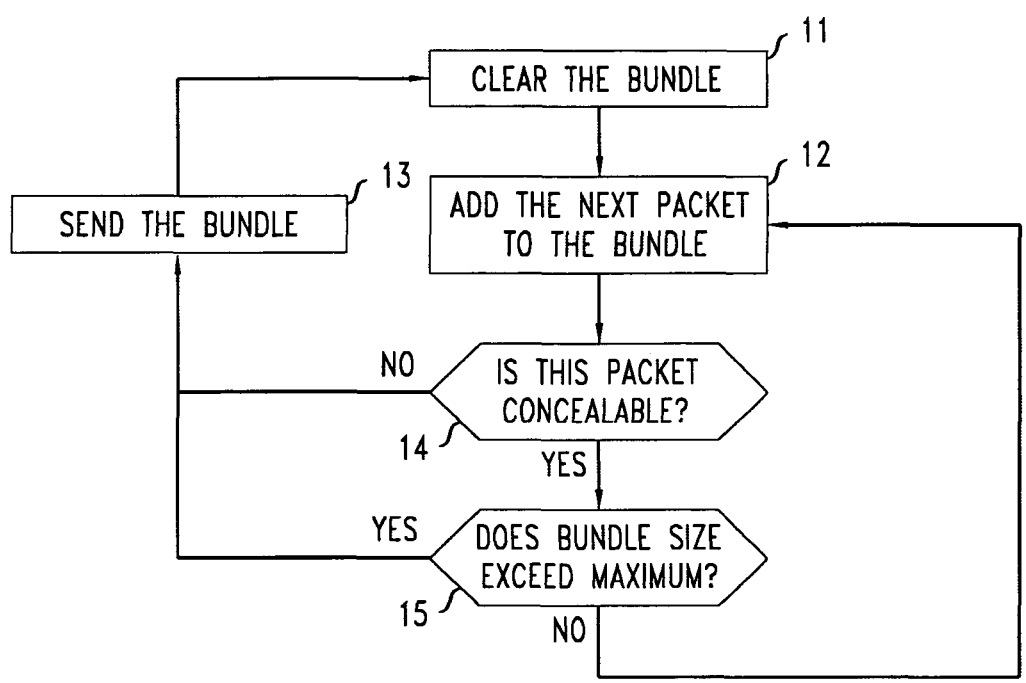

US 8,477,760 B2

METHOD AND APPARATUS FOR PERFORMING ACTIVE PACKET BUNDLING IN A VOICE OVER IP COMMUNICATIONS SYSTEM BASED ON VOICE CONCEALABILITY

FIELD OF THE INVENTION

The present invention relates generally to the field of packet based communications networks for providing VoIP (Voice over Internet Protocol) communications services, and in particular to a method and apparatus for bundling voice packets together for transmission based on certain characteristics of the given packets.

BACKGROUND OF THE INVENTION

In Voice-over-IP (VoIP) communications systems, voice signal data is transmitted across a telecommunications network to a receiver as a series of discrete packets. Each packet contains a sample of speech material, each typically comprising one speech "frame," and the speech material of the transmitted packets is then combined, in sequence, with the other transmitted packets, at the network receiver. (Speech signals are typically divided into a contiguous sequence of "frames," where each such speech "frame" is a speech segment represents a predetermined time interval, such as, for example, 20 milliseconds.) Thus, the receiver is able to reconstruct the transmitted speech signal for appropriate playback to a listener.

However, since packets cannot be guaranteed to have successfully transited the network, or may not be guaranteed to have done so in an amount of time required for the receiver to reconstruct the speech signal in "real time," the receiver must somehow have the ability to conceal the effects of packet loss to the user. Such packet loss concealment (PLC) algorithms are well known to those skilled in the art, and typically compensate for "lost" packets by extrapolating from the received speech, in order to generate appropriate "replacement" speech material for the listener. Nearly all conventional PLC algorithms operate based on the assumption that missing speech may be generally well predicted from the immediately preceding speech. This is a typically reasonable assumption because speech tends to be "quasi-stationary" (QS) in nature—that is, the speech signal varies relatively slowly in comparison to the packet size. However, such QS behavior, while usual, does not hold true for all speech packets.

In co-pending U.S. patent application Ser. No. 10/953,907, "Method And Apparatus For Measuring Quality Of Service In Voice-Over-IP Network Applications Based On Speech Characteristics," filed by M. Lee et. al. on Sep. 29, 2004 and commonly assigned to the assignee of the present invention, a method for measuring the Quality-of-Service (QoS) of a packet-based VoIP communications network is described which is based not only on packet loss rate data (as was conventional), but also on particular characteristics of the speech data itself. In particular, an estimate of what is referred to as "QS failures" (i.e., times when the generally quasi-stationary nature of a speech packet fails) is used therein, in conjunction with a packet loss rate, to calculate the desired QoS measure. In particular, U.S. patent application Ser. No. 10/953,907 introduced the term "voice concealability" to indicate the likelihood that speech will meet the QS assumption of the PLC algorithms, and the term "voice risk" to indicate the likelihood that speech will not meet this QS assumption. Moreover, U.S. patent application Ser. No. 10/953,907 identified certain measures of "voice risk" and "voice concealability" for use in a method for measuring the QoS of a VoIP system. U.S. patent application Ser. No. 10/953,907 is hereby incorporated by reference as if fully set forth herein.

Finally, in order to reduce the required bandwidth, many VoIP systems use a technique known as packet bundling. Packet bundling, familiar to those skilled in the art, occurs when a scheduler or other network element intentionally delays the transmission of some speech frames so that they may be transmitted simultaneously with subsequent speech frames. This advantageously reduces the required bandwidth, since only a single packet header is required to transmit multiple frames, which are thereby transformed into a single packet. However, delaying speech frames for purposes of bundling increases the risk that the receiver will run out of speech material, and therefore will have to run the PLC algorithm, risking quality degradation if the PLC algorithm fails to adequately conceal the lost speech.

SUMMARY OF THE INVENTION

We have recognized that the concepts of "voice risk" and "voice concealability" as used in the method for measuring the QoS of a VoIP system described in U.S. patent application Ser. No. 10/953,907 may be advantageously employed for purposes of active packet bundling in a VoIP (Voice over Internet Protocol) communications system. More specifically, in accordance with the principles of the present invention, a method and apparatus is provided for performing active packet bundling in a VoIP (Voice over Internet Protocol) communications system based on a determination of the voice concealability of one or more speech frames to be transmitted. By advantageously ensuring that only well-concealed frames are delayed for bundling, it is more likely that the receiver will run the PLC algorithm when it is most effective (i.e., when it is likely to perform well at reconstructing the missing speech frame), rather than when it is more likely to be ineffective. This advantageously allows for a reduction in bandwidth while minimizing any potential negative impact on quality.

In particular, the present invention provides a method and apparatus for performing packet bundling of voice frames comprised in a sequence of voice frames to be transmitted across a Voice-over IP communications network, the method or apparatus comprising steps or means for (i) determining whether a given voice frame comprised in the sequence of voice frames is concealable; (ii) bundling the given voice frame together with at least one subsequent voice frame in the sequence of voice frames when the given voice frame has been determined to be concealable; and (iii) transmitting the bundled voice frames together across the communications network as a single packet.

BRIEF DESCRIPTION OF THE DRAWINGS

FIG. 1 shows a flowchart of a method for performing packet bundling based on voice concealability in accordance with an illustrative embodiment of the present invention.

DETAILED DESCRIPTION OF THE ILLUSTRATIVE EMBODIMENTS

As pointed out above, the success of PLC algorithms depends upon the algorithm's reliance upon the QS assumption, as well as the reliability of the QS assumption for a given speech sample. If an unpredictable change occurs in the pitch or vocal tract shape, the replacement material is not likely to match the missing material, and the user is more likely to hear a distortion in the voice. As defined in U.S. patent application Ser. No. 10/953,907 (cited and incorporated by reference above), we use the term "voice concealability" to indicate the likelihood that speech will meet the QS assumption of the PLC algorithms, and the term "voice risk" to indicate the likelihood that speech will not meet this QS assumption. (In other words, "voice risk"=1/"voice concealability".)

Thus, in accordance with one illustrative embodiment of the present invention, one specific measure of voice risk—referred to as the "quasi-stationary failure estimate," or the QSFE, for short—may be advantageously employed. The QSFE is essentially an estimate of the phoneme rate.

Note that an "ideal" voice risk measure would calculate the proportion of times a PLC algorithm fails to adequately conceal lost speech from a listener. But such an "idea" scheme might be too complex for many applications and would depend substantially on the details of the particular PLC algorithm being used.

Thus, in accordance with one illustrative embodiment of the present invention, the QSFE is used to provide a practical voice risk measure that, in particular, estimates the phoneme rate, specifically by counting the number of "bumps" in the energy of a speech waveform. (See U.S. patent application Ser. No. 10/953,907 for a detailed description of an illustrative method for computing the QSFE.)

Although the above described illustrative embodiment of the present invention may be performed without any knowledge of the particular PLC algorithm which will be used, in many cases, the specific PLC algorithm which will be employed at the receiver is known by the encoder. In such a case, the encoder advantageously determines a measure of voice risk based on a particular associated PLC algorithm.

More specifically then, in accordance with another illustrative embodiment of the present invention, a score is assigned for a given speech frame (e.g., packet), wherein the score represents how well a particular associated PLC algorithm will generate speech that is either accurate or that sounds natural and does not change the perceived quality or meaning of the sounds. Illustratively, an encoder can execute the particular PLC algorithm on a given packet (i.e., hypothesize the loss of the given packet) in order to determine, and thus to score, how well the resulting speech matches the actual speech frame. If the score is high (i.e., greater than a predetermined threshold), the speech frame is identified as "concealable" and marked as a bundling candidate. Otherwise, it is not.

When frames (i.e., packets) deemed by the encoder to be "concealable" are marked as a bundling candidate by the encoder, they are held in abeyance until either a packet which is not "concealable" is identified, or until a maximum bundle size containing a number, m, of packets, is exceeded. Illustratively, m=2. If a frame is not concealable, the frame, together with any frames being held in abeyance, are sent immediately, bundled as a single packet. Note that when the encoder marks a frame as concealable, it advantageously judges the concealability of the next frame as if both frames had been lost, since both frames will potentially be delayed. In addition, by knowing the maximum bundle size, m, it can advantageously use this knowledge by only considering frames that might possibly be bundled (based on its having not yet exceeded the maximum bundle size).

FIG. 1 shows a flowchart of a method for performing packet bundling based on voice concealability in accordance with an illustrative embodiment of the present invention. As shown in the figure, the current bundle is initially cleared in block 11, and then, the next packet to be transmitted is added to the current bundle in block 12.

Next, decision block 14 determines whether this packet is concealable, in accordance with the one of the above described illustrative embodiments of the invention. If it is determined by decision block 14 that the packet is not concealable, flow continues to block 13, which sends (i.e., transmits) the current bundle and then returns flow to block 11 to begin assembling a new bundle. If, on the other hand, decision block 14 determines that the packet is concealable, decision block 15 then determines whether the maximum bundle size has been exceeded—that is, it determines whether the current bundle size exceeds the predetermined parameter value, m.

If decision block 15 determines that the maximum bundle size has been exceeded (i.e., that the current bundle size exceeds the predetermined parameter value, m), then flow continues to block 13, which sends (i.e., transmits) the current bundle and then returns flow to block 11 to begin assembling a new bundle. If, on the other hand, decision block 15 determines that the maximum bundle size has not been exceeded (i.e., that the current bundle size does not exceed the predetermined parameter value, m), then flow returns to block 12, which adds the next packet to the bundle. Flow then continues with decision block 14 to process this next packet.

The method of FIG. 1 may, in accordance with various illustrative embodiments of the present invention, be substantially represented in a computer readable medium and may be executed wholly or in part by an otherwise conventional computer or a processor, which may, for example, comprise either special purpose or general purpose hardware.

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope. In addition, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

We claim:

1. A method for performing packet bundling of voice frames comprised in a sequence of voice frames to be transmitted across a Voice-over IP communications network, the method comprising the steps of:

determining, with use of a processor, whether or not each of a plurality of voice frames comprised in said sequence of voice frames is concealable, said determination being made, based on a quantitative analysis of speech waveform energy, for each of said plurality of voice frames independently with respect to the other voice frames of said plurality of voice frames in said sequence, wherein the quantitative analysis includes counting a number of bumps in the speech waveform energy;

assigning a score to each of said plurality of voice frames based on the quantitative analysis;

bundling, with use of the processor, a given one of said voice frames together with at least one subsequent voice frame in said sequence of voice frames when the score of the given one of said voice frames has been determined to satisfy a threshold; and transmitting, with use of a transmitter, said bundled voice frames together across said communications network as a single packet; and transmitting, with use of a transmitter, one or more other ones of said plurality of voice frames across said communications network without bundling said other voice frames together with subsequent voice frames, when the scores of said other voice frames have been determined not to satisfy a threshold.

2. The method of claim 1 further comprising the step of counting a number of voice frames which have been bundled together and transmitting said bundled voice frames together across said communications network as a single packet when said number of voice frames which have been bundled together satisfies a threshold.

3. The method of claim 1 wherein said step of determining whether or not the particular voice frame comprised in said sequence of voice frames is concealable is based on an associated packet loss concealment algorithm.

4. The method of claim 3 further comprising the steps of:
executing the associated packet loss concealment algorithm based on a hypothetical assumption that the particular voice frame has been lost; and
calculating said measure of voice concealability based on said execution of the associated packet loss concealment algorithm.

5. The method of claim 1 wherein said step of determining whether or not a particular voice frame comprised in said sequence of voice frames is concealable comprises calculating a measure of voice concealability based on a quasi-stationary failure estimate which comprises a phoneme rate estimate.

6. The method of claim 5 wherein the phoneme rate estimate is determined based on the quantitative analysis of speech waveform energy.

7. An apparatus for performing packet bundling of voice frames comprised in a sequence of voice frames to be transmitted across a Voice-over IP communications network, the apparatus comprising:
a processor which determines whether or not each of a plurality of voice frames comprised in said sequence of voice frames is concealable, said determination being made, based on a quantitative analysis of speech waveform energy, for each of said plurality of voice frames independently with respect to the other voice frames of said plurality of voice frames in said sequence, wherein the quantitative analysis includes counting a number of bumps in the speech waveform energy, which assigns a score to each of said plurality of voice frames based on the quantitative analysis, and which bundles a given one of said voice frames together with at least one subsequent voice frame in said sequence of voice frames when the score of the given one of said voice frames has been determined to satisfy a threshold; and
a transmitter which transmits said bundled voice frames together across said communications network as a single packet, and which transmits one or more other ones of said plurality of voice frames across said communications network without bundling said other voice frames together with subsequent voice frames, when the scores of said other voice frames have been determined not to satisfy a threshold.

8. The apparatus of claim 7 wherein said processor further counts a number of voice frames which have been bundled together, and wherein said transmitter further transmits said bundled voice frames together across said communications network as a single packet when said number of voice frames which have been bundled together satisfies a threshold.

9. The apparatus of claim 7 wherein said processor determines whether or not the particular voice frame comprised in said sequence of voice frames is concealable based on an associated packet loss concealment algorithm.

10. The apparatus of claim 9 wherein said processor executes the associated packet loss concealment algorithm based on a hypothetical assumption that the particular voice frame has been lost, and calculates said measure of voice concealability based on said execution of the associated packet loss concealment algorithm.

11. The apparatus of claim 7 wherein said processor determines whether or not each of a plurality of voice frames comprised in said sequence of voice frames is concealable by calculating a measure of voice concealability based on a quasi-stationary failure estimate which comprises a phoneme rate estimate.

12. The apparatus of claim 11 wherein the phoneme rate estimate is determined based on the quantitative analysis of speech waveform energy.

13. A non-transitory computer readable medium comprising executable program code for performing packet bundling of voice frames comprised in a sequence of voice frames to be transmitted across a Voice-over IP communications network, the executable program code configured to:
determine whether or not each of a plurality of voice frames comprised in said sequence of voice frames is concealable, said determination being made, based on a quantitative analysis of speech waveform energy, for each of said plurality of voice frames independently with respect to the other voice frames of said plurality of voice frames in said sequence, wherein the quantitative analysis includes counting a number of bumps in the speech waveform energy;
assign a score to each of said plurality of voice frames based on the quantitative analysis; and
bundle a given one of said voice frames together with at least one subsequent voice frame in said sequence of voice frames when the score of the given one of said voice frames has been determined to satisfy a threshold,
wherein said bundled voice frames are configured to be transmitted together across said communications network as a single packet and wherein one or more other ones of said plurality of voice frames are configured to be transmitted across said communications network without bundling said other voice frames together with subsequent voice frames, when the scores of said other voice frames have been determined not to satisfy a threshold.

14. The computer readable medium of claim 13 wherein said executable program code is further configured to:
count a number of voice frames which have been bundled together; and
determine when said number of voice frames which have been bundled together satisfies a threshold,
wherein said bundled voice frames are configured to be transmitted together across said communications network as a single packet when said number of voice frames which have been bundled together satisfy the threshold.

15. The computer readable medium of claim 13 wherein said executable program code is configured to determine whether or not the particular voice frame comprised in said sequence of voice frames is concealable based on an associated packet loss concealment algorithm.

16. The computer readable medium of claim 15 wherein said executable program code is further configured to:
   execute the associated packet loss concealment algorithm based on a hypothetical assumption that the particular voice frame has been lost, and
   calculate said measure of voice concealability based on said execution of the associated packet loss concealment algorithm.

17. The computer readable medium of claim 13 wherein the executable program code is further configured to determine whether or not each of a plurality of voice frames comprised in said sequence of voice frames is concealable by calculating a measure of voice concealability based on a quasi-stationary failure estimate which comprises a phoneme rate estimate.

18. The computer readable medium of claim 17 wherein the phoneme rate estimate is determined based on the quantitative analysis of speech waveform energy.

* * * * *